Feb. 5, 1957  P. B. MAUER  2,780,130
REFLEX SIGHT HAVING A DICHROIC BEAM-COMBINING MIRROR
Filed Jan. 29, 1954
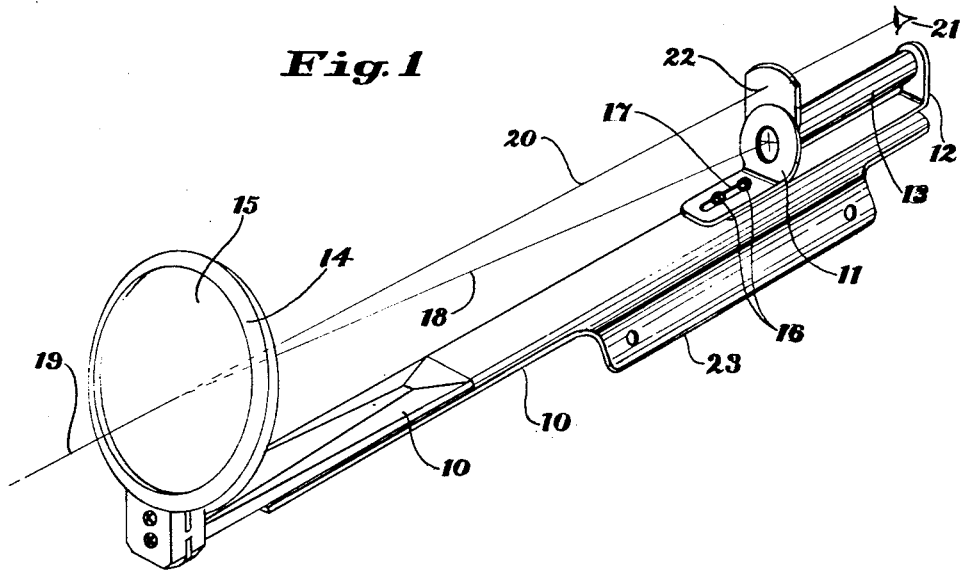
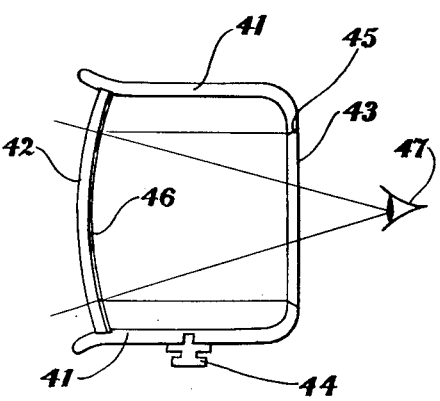
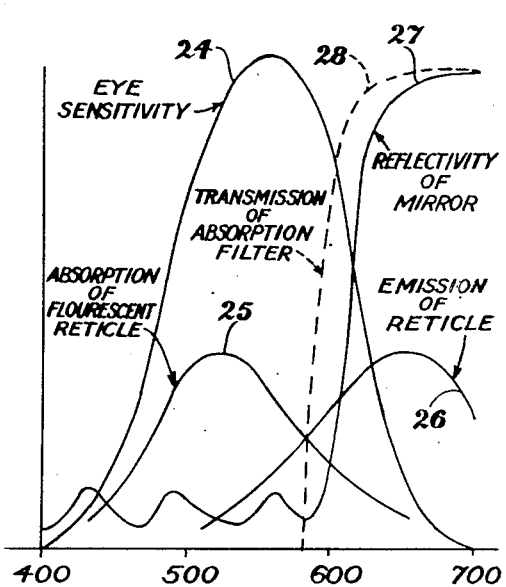
Paul B. Mauer
INVENTOR.
BY
ATTORNEY & AGENT

United States Patent Office 2,780,130
Patented Feb. 5, 1957

2,780,130

REFLEX SIGHT HAVING A DICHROIC BEAM-COMBINING MIRROR

Paul B. Mauer, Rochester, N. Y., assignor to Eastman Kodak Company, Rochester, N. Y., a corporation of New Jersey Application January 29, 1954, Serial No. 406,967

2 Claims. (Cl. 88—2.3)

This invention relates to infinity reflex sights, such as gun sights and camera finders.

The objects of the invention are to increase the apparent brightness of the reticle or frame lines projected onto the object field and to increase the color contrast between the reticle pattern and the object field itself and thereby to increase the visibility of the reticle without deleteriously decreasing the scene brightness.

Reflex sights or finders are well known and have a variety or forms, such as gun sights and camera finders. In all forms, however, there is some kind of a reticle pattern such as frame lines marking the outline of the area of the object field which will be photographed at one exposure by a camera. Light from this reticle pattern is reflected from a semi-transparent mirror surface through which the object field is viewed, the curvature of the semi-reflecting surface being such as to give the reflected rays approximately the same vergency as the transmitted rays coming from the object field and thereby to make the reticle pattern appear superimposed upon the object field and at approximately the same distance.

According to the invention, a reflex sight or finder is made up embodying one or more of three features, each of which increases the brightness of the reticle or the contrast between the reticle and the object field.

According to one feature of the invention, the semi-transmitting mirror is coated with a sharp-cutting multiple layer type interference filter coating of the general type shown in U. S. Patents 2,552,184 by Koch and 2,379,790 and 2,412,496 by Dimmick. This permits higher light efficiencies than the use of lightly silvered reflectors or simple high-index coatings and under most circumstances increases the color contrast between the reticle and the scene.

According to another feature of the invention, fluorescent material is used in the reticle. This feature broadly has been suggested previously and is described in copending application Serial No. 406,950 filed concurrently herewith by Donald L. Wood. This feature, however, has peculiar advantages when combined with either or both of the other two features of the present invention. Fluorescent materials absorb light in one range of wavelengths, as is well known, and emit fluorescent light in another range of wavelengths, and in this form of the invention, the semi-transparent mirror is designed to transmit freely the activating wavelengths and to reflect to a high degree the fluorescent wavelengths, thus doubly increasing the efficiency and also improving the color contrast, because in the light from the distant scene the wavelengths corresponing to the fluorescent wavelength are filtered out and only the contrasting colors are transmitted by the semi-transparent mirror.

According to the third feature of the invention, in the case of brightly illuminated scenes such as a daylight sky, a sharp-cutting absorption color filter is provided in the exit pupil of the system, the filter being chosen to transmit the fluorescent wavelengths and to absorb the other wavelengths. This will serve to reduce the scene brightness by absorbing the rays transmitted by the mirror without noticeably reducing the reticle brightness due to the rays reflected by the mirror. As is well known, the brightness of a brilliantly lighted scene may be cut without reducing the over-all visibility or visual acuity and in some cases the acuity may even be increased by this feature of the invention. It will be noted that a filter in the exit pupil does not cut down the transmission of the activating light coming through the semi-transparent mirror and falling on the fluorescent reticle. According to a special form of this feature of the invention, useful when the activating light falls directly on the fluorescent material and hence when the light transmitted by the mirror does not play an important part in activating the fluorescent reticle, the scene brightness is optionally cut down by a filter in front of the system rather than a colored filter in the exit pupil. The filter in front of the system has the advantage that it can be made to increase the color contrast between the field and the reticle pattern by choosing this filter so that it absorbs the wavelengths reflected by the mirror more than the wavelengths transmitted by the mirror, although it cannot transmit 100 percent of the light of wavelengths transmitted by the mirror for in that case the scene brightness is not reduced as is desired in the case of bright scenes. In general, however, a neutral gray filter is suitable in this position because with a properly coated semi-transparent mirror the color contrast is about as great as is possible.

In the accompanying sheet of drawings:

Fig. 1 is a perspective view of a simple gun sight according to the invention.

Fig. 2 is a graph showing roughly the spectral photometric properties of the various elements of the system.

Fig. 3 is a cross-sectional view greatly enlarged of a suitable interference filter coating.

Fig. 4 is a diagrammatic axial section of a camera view finder according to the invention.

In Fig. 1 is shown a simple form of a gun sight suitable for manual firearms. A long metal strip 10 forms a base for the instrument and is attached to the barrel by conventional means such as the lip 23. At the rear end of the base 10 are attached two clips 11, 12, which are provided with concavities on the sides facing each other for receiving the ends of a fluorescent plastic rod 13 and supporting it between the two clips. The forward clip 11 is also provided with a hole through which the end of the rod may be view. Both ends of the rod are fully silvered or optionally coated ith white paint or pigment, and the reticle pattern is cut or ruled in the coating at one end of the rod. Light from the general surroundings (or optionally from an auxiliary light source) falls upon the rod through the sides thereof and activates the fluorescent material therein to emit fluorescent light in all directions. A small part of this light strikes the surface of the rod from the inside at an angle smaller than the critical angle of total internal reflection, which is about 40 degrees, and emerges and is lost so far as the purposes of the sight are concerned. The greater part of the light, however, is trapped within the rod by total internal reflection and is transmitted along the rod by the well known light conducting properties of transparent rods until it reaches an end where normally it would emerge. The ends are silvered or whitened to reflect most of this light back into the rod, however, except for the light which emerges through the reticle pattern ruled in the coating at the front end. I have found that silvering or whitening the back end increases the brightness of the reticle when the length of the rod is less than about an inch and a half or two inches in the case of typical fluorescent plastics now available on the market, but that it has little or no effect when the rod is longer than this. Optionally, a different reticle pattern can be ruled in the silver at the rear end so that by the simple means of reversing the rod end for end, a different reticle pattern is provided in the sight. The amount of light lost by the rulings made in the silver coating at the back end for such a purpose is insignificant.

At the front end of the base 10 is provided a lens mounting ring 14 supporting a semi-transparent mirror 15, which is formed by taking the meniscus lens of zero power and coating the concave face with a sharp-cutting multiple layer type interference filter coating according to the invention. The mirror is mounted with its concave face toward the rear facing the reticle. The distance between the reticle and the mirror is conveniently made adjustable as for example by the screws 16 in slot 17 so that the reticle can be accurately located at the focal point of the mirror 15. (Of course in instruments for setting on near objects the reticle and mirror are placed closer together.) A ray of light 18 from the reticle is reflected from the mirror and combined with a ray 19 which comes from the object field and is transmitted by the mirror, and the two rays combined to form the ray 20 to the eyepoint 21. One of the great advantages of the reflex sight is that the eye can be moved around over an area roughly corresponding to the area of the mirror without introducing any error due to parallax between the reticle image and the object field. This feature is taken advantage of by providing a filter 22 covering part of the area of the exit pupil so that an observer can move his eye upward and look at the mirror directly or move it downward and look at the mirror through the filter 22, choosing the position which gives the best visibility.

Fig. 2 is a graph showing roughly the spectral photometric properties of the various elements of the system. The abscissa scale shows the wavelengths of visible light from 400 to 700 millimicrons. Five curves are shown: first, the usual eye-sensitivity curve 24 having a maximum at about 560; second, a curve 25 showing the effectiveness of the exciting radiation incident upon the fluorescent rod and having a maximum at about 515; third, a curve 26 showing the intensity of the fluorescent radiation and having a brightness maximum at about 650; fourth, the reflectivity curve 27 of the mirror having a high plateau in the range from about 630 to 700 and beyond and a sharp drop to a low broad trough from about 590 down to 400 and beyond; and fifth, a dotted curve 28 showing the transmission of the filter also having a high plateau, from about 600 to 700 and a trough from 400 to about 560. It will be observed that the multiple coating of the mirror is so designed and the filter material is so chosen that the reflectivity of the mirror and the transmission of the filter are very high in the wavelength corresponding to the maximum fluorescent radiation and are very low through the rest of the spectrum, and particularly the reflectivity of the mirror is low in the wavelength range of the most effective exciting radiation. In the sights already made up, the wavelength of maximum fluorescent radiation has been in the red or orange region from 600 to 700, distinctly different from the wavelength of the maximum eye sensitivity, and the sights have proven to be very efficient. However, conclusive tests have not been made to see whether or not the wavelength of maximum fluorescent radiation should correspond to the wavelength of maximum eye sensitivity under some conditions of use.

Fig. 3 shows one form of the multiple layer type interference filter such as is disclosed more fully in the Koch and Dimmick patents already referred to. These coatings consist of alternate layers of high (greater than 2.0) and low (less than 1.5) index transparent material coated onto the surface of the glass. In designing such a filter, it is convenient to start with a preliminary design in which each layer is a quarter wavelength thick with respect to the wavelength that is to be highly reflected and to modify individual thickness to suppress unwanted reflection peaks. It will be noted that most of the examples in the Koch patent are designed for maximum reflection at about 550 millimicrons, and that the maximum can be shifted to 700 simply by increasing the thickness of each layer in the ratio of 700 to 550 plus a small correction due to the lower refractive index of the material for the longer wavelength. From three to fifteen layers coated on the glass give suitable sharp-cutting interference filters for the purposes of the invention. In general, more layers give higher scene visibility without loss in reticle contrast, and a greater number of layers up to about 15 are useful under some conditions.

One example which has been tried and proved very satisfactory consisted of 7 layers of alternate ZnS and MgF$_2$ in equal optical thickness. The individual layers were all of optical thickness equivalent to one quarter wavelength at 715 millimicrons. This provided the necessary high reflectivity from 600 to 700 millimicrons and a transmission peak coincident with maximum eye sensitivity. It may be that special thickness ratios such as those cited in Dimmick 2,412,496 would be advantageous for some applications.

Fig. 4 shows a reflex camera finder according to the invention. The body 41 of the finder is made of fluorescent plastic and supports the semi-transparent mirror 42 at the front thereof and a transparent cover plate 43 at the rear. The whole finder is mounted on a camera by a conventional lug 44. The reticle 45 is formed by allowing total internal reflection at the beveled edge of the fluorescent plastic body. One surface of the mirror 42 is coated with a sharp-cutting multiple layer interference filter coating 46 such as that shown in Fig. 3 so that light from the reticle 45 is reflected and combined with rays of light from the object field to proceed then to the eyepoint 47. In a simple form of sight, the mirror 42 is made up of a bent or bowed plate or lens of zero power, having a curvature such that the reflected image of the reticle or frame marks 45 appear at approximately the same distance as the object field, that is, usually at infinity. The reflecting coating 46 transmits the light of maximum visibility from the object field and reflects light of a different color from the frame mark 45, thus giving good color contrast.

Sights and finders according to the invention have been made up and have given reticle images of such brightness and color contrast in the preferred forms of the invention that they may be seen even when looking directly or almost directly toward diffuse lighting fixtures such as are commonly used in offices without providing auxiliary illumination for the frame line.

I claim:

1. A reflex sight comprising a dichroic beam combining mirror having a generally spherically curved surface adapted to be viewed from its concave side and having its axis tilted with respect to the line of sighting, and reticle means on the concave side of said surface offset from the line of sighting in the direction of the inclination of the axis of the mirror, said reticle comprising a rod of transparent material containing a fluorescent dye adapted to receive light through the lateral surfaces of the rod and to emit fluorescent light in a wavelength band for which the dichroic mirror is highly reflective, both ends of the rod being coated with a highly reflective coating, the rod being roughly parallel to the sighting axis and the reticle pattern being cut through the coating of the end of the rod nearest the dichroic mirror, whereby the retile pattern is illuminated from behind by the fluorescent light.

2. A reflex sight according to claim 1 in which a color filter is provided covering part and only part of the exit pupil whereby the observer can sight optionally through the filter or through the clear area beside the filter, said filter transmitting the fluorescent color more freely than other colors.

References Cited in the file of this patent

UNITED STATES PATENTS

| 2,187,057 | Sauer | Jan. 16, 1940 |
| 2,392,979 | Douden | Jan. 15, 1946 |
| 2,517,779 | Flint | Aug. 8, 1950 |
| 2,633,051 | Davis | Mar. 31, 1953 |